No. 740,701.

Patented October 6, 1903.

UNITED STATES PATENT OFFICE.

AMÉDÉE MATHURIN GABRIEL SÉBILLOT, OF PARIS, FRANCE.

TREATMENT OF SULFID ORES.

SPECIFICATION forming part of Letters Patent No. 740,701, dated October 6, 1903.

Application filed January 10, 1902. Serial No. 89,222. (No specimens.)

*To all whom it may concern:*

Be it known that I, AMÉDÉE MATHURIN GABRIEL SÉBILLOT, engineer, a citizen of the French Republic, residing at Paris, France, (and having post-office address 60 Boulevard de Clichy, XVIII° arrondissement, Paris,) have invented certain new and useful Improvements in the Treatment of Ores Containing Sulfur, of which the following is a specification.

For the treatment of ores containing sulfur several processes have been proposed having for their object the sulfatation of the metals and based on the attack of the ores by bisulfates or boiling concentrated sulfuric acid; but hitherto the processes devised for this purpose have been incomplete and did not comprise the means required for realizing a perfect cycle of operations.

My process does away with the disadvantages inherent to the previous processes and permits of extracting metals from minerals containing sulfur and of recovering at the same time the sulfuric acid corresponding to the totality of the sulfur contained in the ore.

My improved process is more especially applicable to the extraction of copper; but it is equally suitable for ores of a simple or of a complex composition. Its essential feature consists in the very important fact that the sulfatation is effected without the use of a sulfuric acid from an extraneous source, the reagent being entirely constituted by the sulfur contained in the ore itself and the oxygen of the atmosphere.

By my invention and by means of the hereinafter-described operations, I reduce to a minimum the proportion of the sulfates of the lower metals in the residue subjected to lixiviation, while I at the same time regenerate the sulfuric acid corresponding to the total amount of sulfur contained in the ore and this without any other waste than that resulting from the attack of the gangues of ores of alkali metals or metals of the alkaline earths.

The normal cycle comprises the following series of operations:

(*a*) The ore is sulfated in a closed vessel by the sulfuric acid acting on the sulfid of copper at a temperature above its boiling-point, according to the following formula:

$$Cu_2S + 4SO_4H_2 = 2SO_4Cu + 2SO_2 + 4H_2O + S;$$

but as soon as the sulfuric acid is dissociated into $SO_3H_2O$, $SO_3$ reacts on the sulfur $S + 2SO_3 = 3SO_2$, and finally the reaction is as follows:

$$Cu_2S + 6SO_4H_2 = 2SO_4Cu + 5SO_2 + 6H_2O.$$

For this reaction one hundred and fourteen calories are wanted, which are furnished by an external source of heat. The sulfuric acid acts on the sulfids of other metals in the same manner. The metals and the antimony are transformed into sulfates, and the sulfurous acid and water-steam are sent into a suitable apparatus to be oxidized and to regenerate thus the sulfuric acid, which is used for reaction on new ores. By that way a continuous cycle is obtained.

(*b*) Lixiviation of the sulfated mineral.

(*c*) Clarifying and precipitating copper from the liquid by means of iron in the ordinary manner.

(*d*) Concentration of the copper-free liquors and crystallization of the iron sulfate.

(*e*) Dissociating calcination of the crystallized iron sulfate and recuperation of the corresponding sulfuric acid, together with a simultaneous production of the peroxid of iron.

(*f*) Treatment of the residues of the lixiviation for the lead, antimony, &c., if such be contained in the residues.

The equation summing up the aforesaid operations may be written, on simplifying the formula of the ore,

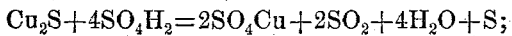
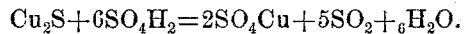
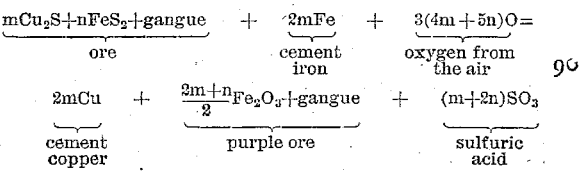

From this equation it will be seen that the whole of the sulfids is turned into sulfuric acid and only that part of it is lost which is absorbed by the bases of the alkali metals or of the metals of alkaline earths contained in the gangue of the ores. By my improved process valuable subproducts are obtained, which, according to the places and surroundings, will pay the whole or part of the expenses of the treatment.

To avoid an excess of iron sulfate in the cement lyes, and more especially for the manufacture of copper sulfate, the order of the above operations may be slightly modified by proceeding after the sulfating operation has taken place to a carefully-conducted calcination, which causes the dissociation of the iron sulfate, but leaves intact the silver and copper sulfates. A mixture is evolved which consists of sulfurous acid and sulfuric anhydrid, which are collected in the apparatus for the regeneration of sulfuric acid.

The preliminary desulfatation reduces in a perceptible manner the volume of the cement lyes, and consequently the quantity of fuel required for their subsequent concentration. It should be remarked that this preliminary dissociation of the iron sulfate does not destroy the copper or silver sulfate if care is taken not to exceed the temperature of 700° centigrade, for at 520° the iron sulfate loses half of its sulfuric acid and is converted into a ferric subsulfate:

$$2(FeSO_4) = Fe_2O_3SO_3 + SO_2,$$

and at 650° centigrade the reaction is complete:

$$Fe_2O_3SO_3 = Fe_2O_3 + SO_3.$$

Copper sulfate, on the contrary, is only partly dissociated at about 700° and completely toward 900°, while the silver sulfate decomposes at a still higher temperature. It should also be observed that my process also renders the formation of copper and silver antimoniates or arseniates impossible, which would fix these metals in an insoluble state. It is besides possible subsequently to recover the antimony by a treatment of the lixiviation residues.

The sulfate of antimony obtained from the antimony contained in the ores by treating them with sulfuric acid $$(Sb_2S_3 + 12SO_4H_2 = Sb_2O_3, 3SO_3 + 12SO_2 + 12H_2O)$$

is insoluble. It remains in the residues of lixiviation. The residues of lixiviation are heated to a temperature between 700° and 750° centigrade. The sulfate of antimony is decomposed as follows:

$$Sb_2O_3, 3SO_3 = Sb_2O_3 + 3SO_2 + 3O.$$

The oxid of antimony becomes distilled and is collected by sublimation, while the sulfurous acid is condensed in lime-water or by any other known method. The antimony may be recovered, because the sulfate of antimony is decomposed at a lower temperature than the other insoluble sulfate, the sulfate of lead remaining in the residues of lixiviation.

It will be seen that the various operations hereinbefore described form a complete cycle, the continuity of which, together with the rational connection of its successive phases, constitutes the novelty of my invention.

Having now particularly described and ascertained the nature of this invention and in what manner the same is to be performed, I declare that what I claim is—

A process for treating ores containing sulfur consisting of sulfating the ore in a closed vessel by the action of sulfuric acid upon the metallic sulfids at a temperature above its boiling-point and simultaneously recovering the sulfuric acid used, calcining the sulfated ore at a temperature of 700° centigrade to dissociate the sulfate of iron to prevent dissolving of a too great quantity of sulfate of iron in the lixiviating liquors, and then lixiviating the calcined ore.

In testimony whereof I have hereunto set my hand in presence of two subscribing witnesses.

AMÉDÉE MATHURIN GABRIEL SÉBILLOT.

Witnesses:
EDWARD P. MACLEAN,
EMILE KLOTZ.